United States Patent [19]
Guillet

[11] 3,717,040
[45] Feb. 20, 1973

[54] MOLECULAR PROBE APPARATUS
[75] Inventor: James Edwin Guillet, Don Mills, Ontario, Canada
[73] Assignee: The governors of The University of Toronto, Toronto, Ontario, Canada
[22] Filed: Sept. 14, 1970
[21] Appl. No.: 71,948

[52] U.S. Cl. .................................73/432 PS, 73/23
[51] Int. Cl. ..............................................G01n 15/08
[58] Field of Search..................73/432 PS, 432 R, 23

[56] References Cited
UNITED STATES PATENTS
3,286,530  11/1966  Ayers..............................73/432 PS Primary Examiner—S. Clement Swisher
Assistant Examiner—Joseph W. Roskos
Attorney—Neill M. S. Johnston

[57] ABSTRACT

Apparatus for determining physical characteristics of particulate material in which the material whose characteristics are to be determined are deposited in a heated tube which is connected through an inlet with an inert carrier gas source. Probe molecules in a vapor source are injected into the carrier gas stream at predetermined intervals or temperatures. The retention time of the probe molecules with respect to the material is measured by a gas detector positioned downstream of the tube adjacent the outlet. The temperature may be varied linearly or progressively and the injection mechanism may respond either to time, to the expiry of the retention time, or to a combination of these factors to provide automatic measurement.

8 Claims, 10 Drawing Figures

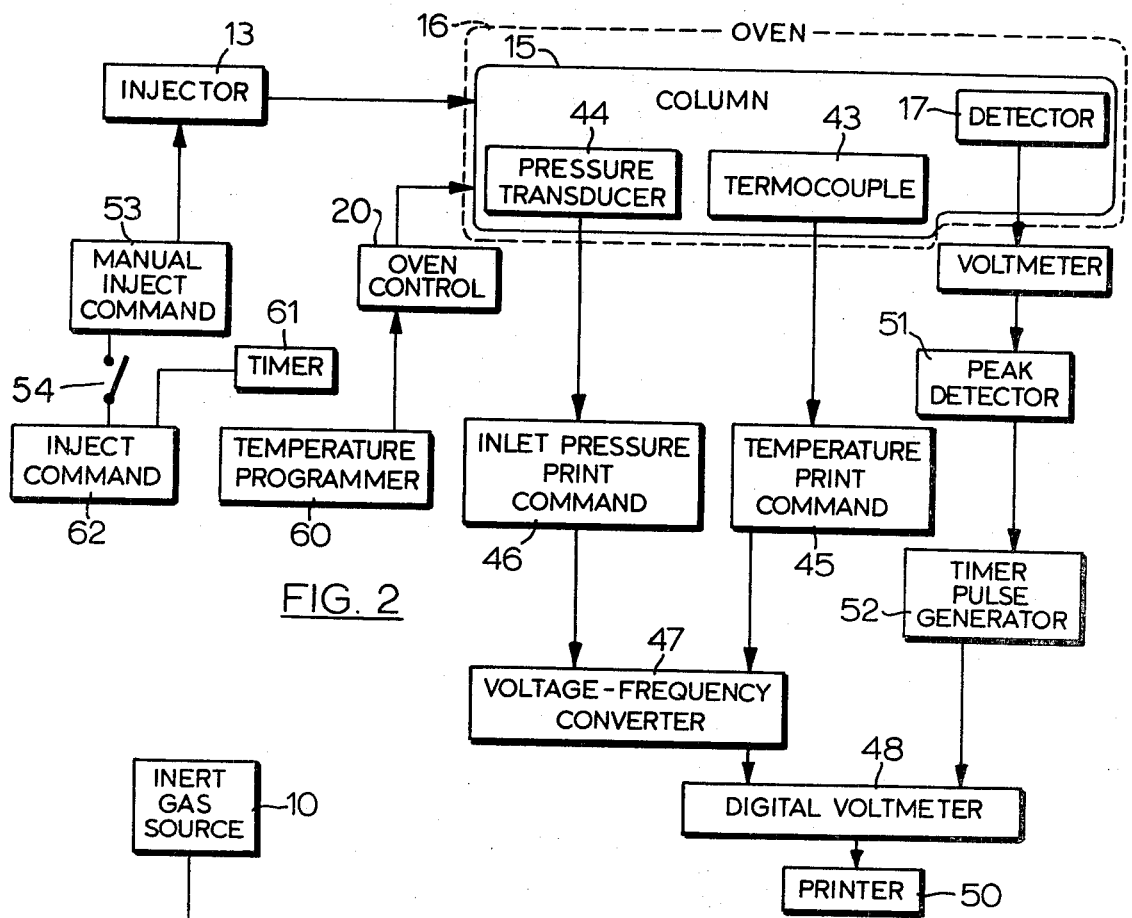

MOLECULAR PROBE APPARATUS

This invention relates to apparatus for determining the properties of synthetic and natural polymers such as glass and melting transitions, diffusion rates of various kinds of molecules in the polymer, the rate of cross-linking, various physical characteristics such as crystallinity and rate of crystallization, surface area measurements on pigments and catalytic surfaces and phase transition measurements on particulate materials and polymers. The apparatus may also be employed for the determination of physical characteristics or of inorganic materials with inorganic vapor phase components, such as ammonia, are compatible. The provision and determination of these characteristics is of particular importance in the design and synthesis of new polymers for industrial applications. The application in research in pigments, characterizing of catalysts will be self-evident.

Previously, the determination of physical characteristics of large molecules has been extremely laborious. It has required, X-ray and infra-red analysis, density measurements and differential scanning calorimetry with the observed results of one technique being employed to reinforce, confirm or further characterize the material being studied. Changes in crystallinity of polymeric systems have involved measurement of volume changes, changes in absorption spectra and optical properties. It is therefore the main object of the present invention to provide apparatus which will enable these aforementioned characteristics to be determined with facility, speed and accuracy.

There is therefore provided in accordance with the present invention apparatus for determining the physical characteristics of particulate materials comprising: a tube for carrying the material whose characteristics are to be determined, said tube having an inlet and an outlet and being of a material inert with respect to the material whose characteristics are to be determined; heating means associated with said tube, variable temperature control means for controlling said heating means; carrier gas control means connected to said inlet for determining the rate of flow and pressure of a stream of carrier gas, injection means for introducing predetermined quantities of a probe, in the vapor phase and a non-reactant marker gas into said carrier gas stream; gas detector means disposed in said tube adjacent said outlet for generating a signal in response to detection of each of said marker gas and said probe, respectively, and timer means operable in response to said signals for determining the time interval between detection of said marker gas and said probe.

In summary the material whose characteristics are to be determined is deposited on an inert surface. A small quantity of a probe molecule, this term will be defined subsequently, in its vapor phase is passed over the deposited material at a predetermined temperature, rate and pressure and the flow period of the vapor sample determined with respect to the temperature. This operation is repeated and the temperature may be increased linearly or progressively.

The above objects and features will be more fully understood from the following description and drawings which are illustrative apparatus in accordance with the invention and the information to be obtained from its use.

FIG. 1 is a schematic diagram of apparatus in accordance with the invention and serves to illustrate the gas flow through the apparatus;

FIG. 2 is a further schematic diagram of apparatus in accordance with the present invention and serves to illustrate the mode of operation and means by which the information is derived;

Figure 3:
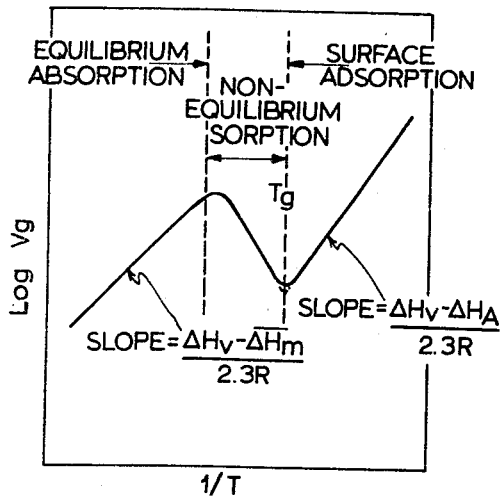
FIG. 3 is a generalized retention diagram derived using apparatus in accordance with the present invention, of probe molecules in the vapor phase on glassy polymer substrates.

It will be understood that the term probe molecule or molecules as used in this specification and the claims refers to material, either complexes or compounds, which in the vapor phase and under the examination conditions of the material whose properties are to be determined will reversibly interact either chemically or physically with the material being examined. It will be further understood that certain probe molecules have the capacity to form chemical complexes under the examination conditions whereas with others the process may be exclusively physical.

FIGS. 1 and 2 are general diagrams which serve to illustrate the gas flow and measuring means respectively of the present apparatus.

As illustrated in these drawings an inert gaseous carrier source 10 is connected through a flow control 11, a flow and pressure gauge 12, to the inlet end of a column or tube 15 mounted within an oven 16. Between the outlet of the flow and pressure gauge 12 and tube 15 a sample valve 13 is interposed. Valve 13 is in turn connected to a probe molecule sample holder 40 and through this to a source, 41, of probe molecules. The probe sample holder 40 and source 41 are mounted in an oven and valve 13 may be operated either manually or automatically to inject small amounts of the probe molecule into the inert gas stream.

Valve 13 may also be connected, if required, depending on the type of gas detector employed, with a source of "marker" molecules, a non-reactant gas, which will be injected simultaneously with the probe molecules.

Adjacent the outlet end of tube 15 is a gaseous detector 17 mounted and the outlet end of tube 15 is connected through a soap bubble flow-meter 42 to the atmosphere.

The temperature of the column is determined by a thermocouple 43 or other suitable indicating means mounted on or in the tube and the pressure within the tube may be indicated by a transducer 44.

Thermocouple 43 and pressure transducer 44 are electrically connected through their respective print command circuits 45 and 46, a voltage-frequency converter 47 and digital voltmeter 48 to a printer 50.

The gaseous detector 17 is similarly connected to the printer 50 through a peak detector circuit 51, timer pulse generator 52 and the digital voltmeter 48.

It will be understood that such circuitry is only by way of example but any equivalent circuit may be employed to give an output in any desired form either digital or graphical.

Oven 16 is provided with an oven control 20 which may be operably connected with a temperature programmer 60 which may be programmed to reset the oven temperature at predetermined temperatures at predetermined intervals or increase the temperature of the oven 20 at a predetermined rate. The oven for the probe source is maintained at a constant temperature but may be adjusted. A timer 61 is electrically connected to an inject command station, 62, which upon actuation operates to open the sample valve or injector 13 to inject the probe and marker molecules into the gas stream.

As an alternative a manual inject command 53 may be provided so that the operator by means of switch 54 may elect to operate the injection mechanism manually or automatically.

The tube or column 15 may either be of glass or metal and the polymer or material whose characteristics are to be determined is deposited either as a thin film or on a suitable inert support.

The timer 51 may be operably connected in any suitable manner to the oven control to respond at a predetermined interval in response to a predetermined time after the oven control reaches a predetermined temperature. Further alternative responses may be to a probe peak indication on the peak detector or to a predetermined interval after a peak probe response.

The gas detector 17 may be a flame ionization detector or a thermal conductivity detector or their equivalent.

The peak sensor and timer 18, provide means to determine the length of time required for the passage of the organic or other vapor through the tube 15, while the digital or graphical output, 50, records the time required for the passage of the organic vapor and the temperature of the column 15 either at the constant temperature of the experiment or the average temperature during a linear increase in the temperature of the column.

The oven control 20, may in certain embodiments provide automatic predetermined resetting of the oven temperature in response to a probe peak reading of the peak sensor 18.

In one mode of operation, a glass column 15, of narrow diameter approximately ½ mm inside diameter is coated with a very thin film of the polymer to be investigated. This is usually done by means of coating from a dilute solution of the polymer. After the solvent has been removed, the column is placed in the oven, 16, of the apparatus and the carrier gas forced through the column at a constant flow rate. A small pulse of probe molecules, usually an organic vapor is then injected through the vale 13, in to the column with usually a smaller marker molecule, such a methane, to act as an indicator of the carrier gas front. The detector 17, at the end of the column, detects first the passage of the methane vapor indicating the position of the carrier gas front by sensing the peak maximum corresponding to the methane vapor. This pulse activates a peak sensor and timer 18, which is stopped by the peak position of the pulse of the probe molecules.

During the passage of the vapor through the column, the temperature of the column is raised at a constant very slow rate and the temperature is recorded at a time corresponding to 0.63 times the total time between the marker and probe peak. As soon as the passage of the probe peak is complete, the sample valve, 13, injects automatically a second sample of probe and methane and the procedure is repeated. In each case the temperature and the time required for the passage of the peak is recorded usually on a digital recorder 50. The data is usually displayed in the form of a plot of log of the time for passage of the organic vapor through the column versus the reciprocal of the absolute temperature at the time corresponding to this passage.

In an alternative mode of operation, the temperature may be raised step-wise with an injection at each temperature and the column operated at a constant temperature until both the methane and probe peaks have been eluted from the column. The temperature is then raised to the next temperature which could be from 3° to 5° higher and rerun by injection of a new sample. The operation of the apparatus is best illustrated in the following general and specific examples.

The polymer to be studied was dissolved in a suitable solvent and deposited on the surface of Chromosorb G (an inert silica support) by gentle stirring in a stream of dry nitrogen to evaporate the solvent. The concentration of the polymer on the absorbent was determined by gravimetric analysis before and after the coating and drying procedure. The samples were dried in a vacuum oven for two hours and then packed into ⅛ inch diameter stainless steel columns five feet in length. The oven 16, and detector 17, with dual flame ionization detectors were used. Nitrogen was used as the carrier gas and measurements were made of the flow rate and pressure drop across the column at the various temperatures. The temperature of the oven was calibrated using a standard thermometer. The column temperatures were constant to within plus or minus 0.3° C.

The two polymers were polymethylmethacrylate and polystyrene. The probe molecules used were n-dodecane (Fisher Scientific Company-purified) and n-hexadecane (J. T. Baker Chemical Co.-purified). The column is allowed to equilibrate for about 5 minutes to reach temperature equilibrium and then a small quantity (about $10^{-6}$ l) of the probe molecules would be injected from valve 13. A small amount of methane was usually included in the sample to mark the position corresponding to no adsorption. The retention volume $V_R$ can be determined from the time between the methane peak and the peak maximum for the particular probe used, and the flow rate of the carrier gas.

The temperature of the oven is then raised approximately 5° C and a further injection of probe molecules is made and the peak times recorded. The sequence is repeated at a series of temperatures, recording the temperature and peak times.

For polymethylmethacrylate the following data were obtained.

```
weight of poly MMA on the column = 0.357g
Nitrogen gas flow rate = 0.496 cc/sec.
probe molecule = n-hexadecane
Temp. °C             time t (sec)
213                    22.3
203                    28.6
195                    34.5
184                    36.8
175                    46.0
165                    46.0
154                    50.6
146                    54.5
135                    47.5
125                    34.7
115                    31.3
107                    32.6
104                    33.4
101                    41.8
95                     49.0
92                     64.5
86                     92.0
77                     159
70                     391
```

```
For polystyrene the following data were obtained
weight polystyrene on the column = 0.088 gr.
Nitrogen carrier gas flow rate = 0.392 cc. per sec.
probe molecule n-dodecane.
Temp. °C             Time t (sec)
54.0                   82.2
58.9                   58.7
63.8                   44.2
68.7                   30.6
73.6                   22.3
78.3                   16.5
81.4                   14.0
83.2                   13.3
85.4                   10.5
90.2                    9.8
93.5                    8.1
96.1                    7.9
105.0                   7.2
110.0                   7.7
113.0                   9.5
118.8                  13.3
124.7                  18.4
128.8                  19.1
131.8                  21.9
138.9                  22.8
142.9                  21.4
148.7                  19.6
152.8                  17.7
162.6                  14.4
172.4                  10.0
192.0                   7.4
```

The data may be plotted directly using an X-Y recorder, in which case the glass transition temperature for the polymer is determine from the first minimum in the retention time $t$.

More fundamental information can be obtained if the logarithm of the retention volume $V_g$ is plotted against the reciprocal of temperature, measured in degrees absolute (°K).

Figure 4:
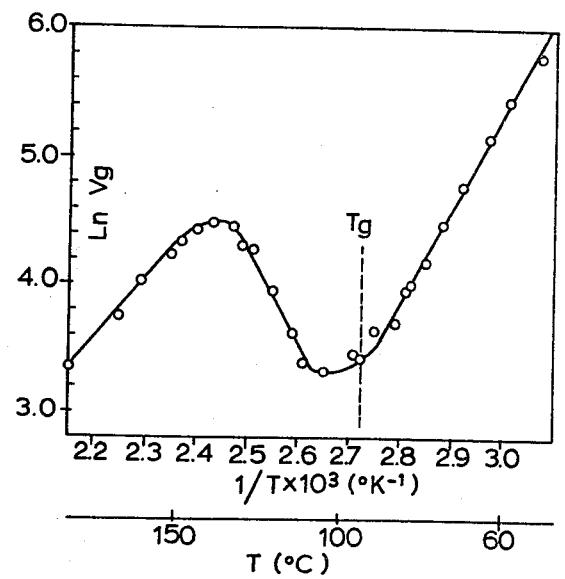
FIG. 4 is a retention diagram, derived using apparatus in accordance with the present invention, for n-dodecane as the probe, on polystyrene with nitrogen, having a flow rate of $0.496$ cc sec$^{-1}$, as the carrier gas.
Figure 5:
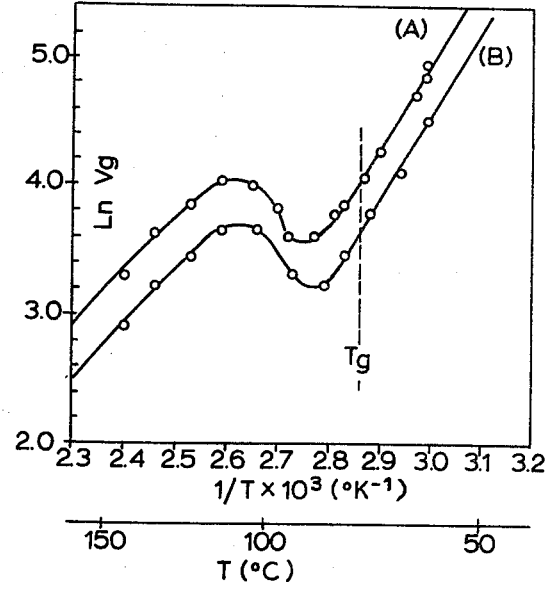
FIG. 5 is a retention diagram, derived using apparatus in accordance with the present invention, for n-dodecane as probe on different polyvinyl chlorides with nitrogen, having a flow rate of $0.496$ cc sec$^{-1}$, as the carrier gas.

In FIG. 3 a generalized retention diagram for the probe vapor component on glassy polymer substrates is illustrated. In FIG. 4 a retention diagram for n-dodecane on polystrene is shown. And FIG. 5 shows a retention diagram for n-dodecane on two samples of polyvinyl chloride of differing molecular weight.

From the slopes of the low- and high- temperature portions of the curve the heat of adsorption and the heat of mixing may be determined.

The information derived from these curves is shown in Table 1 below.

Table I

| Polymer substrate | Polyvinyl chloride (A) | Polyvinyl chloride (B) | Polystyrene | Poly mMA |
|---|---|---|---|---|
| Mol wt (Mn) | 68,000 | 35,500 | 51,000 | 48,000 |
| Column loading, g | 0.227 | 0.116 | 0.88 | 0.357 |
| Solute | n-Dodecane | n-Dodecane | n-Dodecane | n-Hexadecane |
| D.S.C. glass transition, °C | 75±2 | 75±2 | 95±2 | 100±2 |
| Temp of first deviation from linear relation $T_1$, °C | 81 | 81 | 88 | 97 |
| Temp of curve min., $t_2$, °C | 91 | 91 | 100 | 105 |
| Enthalpy of adsorption $\Delta H_a$, kcal mol$^{-1}$ | −1.2 | −1.3 | −2.7 | a |
| Enthalpy of mixing $\Delta H_m$, kcal mol$^{-1}$ | +3.8 | +3.8 | +2.5 | +4.4 |

$^a$Vapor pressure data on n-hexadecane not available in this temperature range

It is believed that at low temperatures there is no solution of the probe molecule below the glass transition temperature, whereas at the glass transition temperature and above, the free volume of the system becomes such that probe molecules begin to penetrate the polymer matrix. The increase in penetrability more than counteracts the increase in vapor pressure of the probe so that an inversion of the usual temperature coefficient of the retention volume occurs and retention time increases as the temperature increases At some higher temperature, diffusion of the probe in the polymer becomes sufficiently rapid so that equilibrium can be established during the time of passage of the probe peak through the tube or column.

In a further series of experiments the same procedure was followed except that instead of raising the column temperature in a step-wise manner, a linear temperature program was used in which the column temperature increased slowly at a constant rate. In this case the temperature is recorded at a time intermediate between the passage of the indicator and probe peaks. This gives the average temperature of the column, and the times are not identical with those obtained in the isothermal mode of operation. This data still can be used to estimate melting and glass transitions and other thermodynamic data may be derived.

In automatic operation the oven 16 was set at a particular temperature $T_o$, and a sample of probe molecules and indicator (methane) injected. The time pulse generator 52, was actuated by peak detector 51 in response to passage of the peak maximum for methane and its operation was terminated by the peak maximum of the probe molecules. The time $t_1$ and temperature $T_1$ were then recorded on the digital print out 50. The passage of the probe peak also triggered a relay (not shown in the temperature program 60) which resets the oven temperature to a new setting approximately 5° C higher than the initial temperature. After a time $t_o$ which is preset to be sufficient to allow the column 16 to reach the new temperature, and complete elution of the previous peak of probe molecules, a new injection of probe molecules is made automatically by actuation of the inject command 52 in response to timer 51. The procedure is repeated automatically in this manner until a present maximum temperature $T_f$ is reached. A digital print-out of the data gives a table of $t$ as a function of the column temperature T.

The procedure described in the first above described examples, was used to coat low density polyethylene on an inert silica support, which was then packed into a 5 ft. ⅛ inch diameter column. Operating as described above the data shown in FIG. 6 was obtained.

In a further series of experiments polyethylene and polypropylene were coated on Chromosorb G from hot toluene or xylene solution. The solvent was evaporated while maintaining its temperature above the precipitation temperature of the polymer so that a continuous film would be obtained. The polymer-coated support was packed into columns or tubes, 15 of ⅛ inch copper tubing using a mechanical vibrator.

The carrier gas, nitrogen, was maintained at a substantially uniform flow (~40cc/min). The "probe" gas dodecane and hexadecane were injected in a substantially constant size (10 nl) together with methane (an inert gas) to assist in the carrier gas front detection and the retention time $t$ determined at various temperatures.

Figure 6:
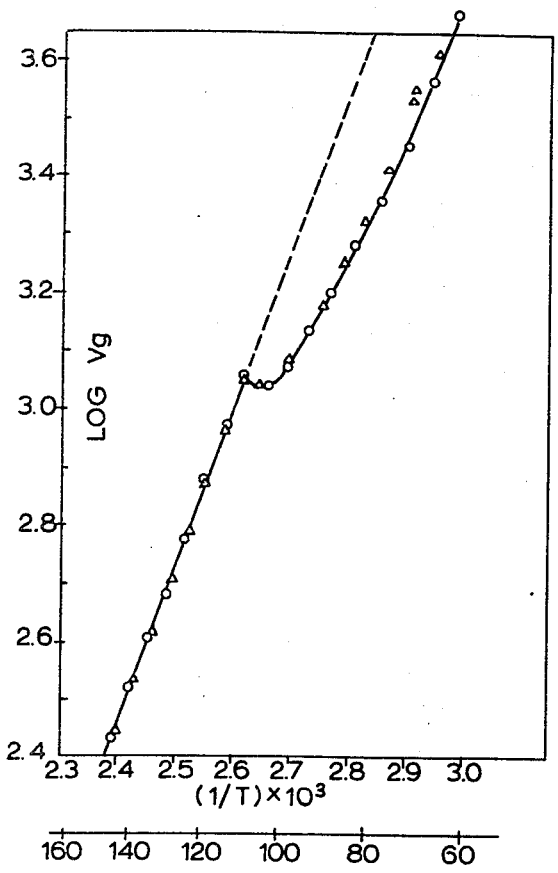
FIG. 6 is a generalized retention curve for polyethylene, derived using apparatus in accordance with the present invention, using dodecane as probe and nitrogen as the carrier gas having a flow rate $\sim 40$cc/min.
Figure 7:
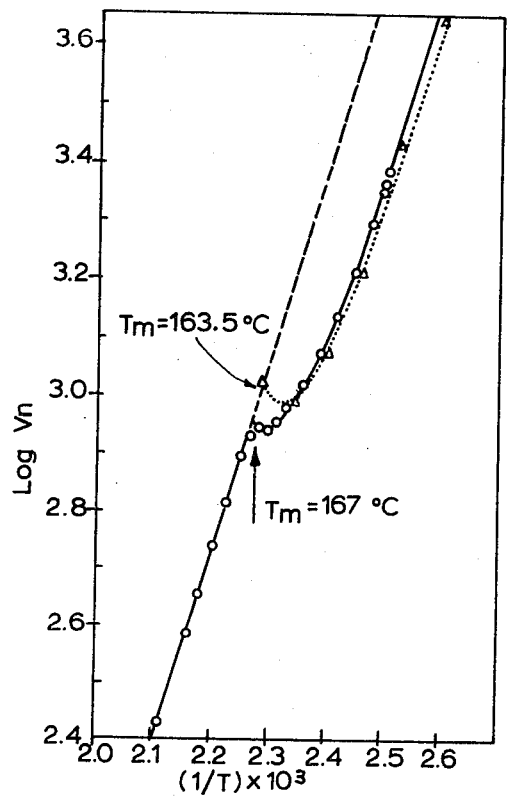
FIG. 7 is a generalized retention curve for polypropylene derived using apparatus in accordance with the present invention, using hexadecane as the probe and nitrogen as the carrier gas having a flow rate $\sim 40$cc/min.

The resulting retention curve for polyethylene when dodecane is employed as a probe is illustrated in FIG. 6, and the retention curve for polypropylene when hexadecane is used as a probe is shown in FIG. 7. In these drawings O, is the melting point, first series, and Δ the melting curve 24 hours later.

If it is assumed that the crystalline regions of the polymer are impenetrable to the probe molecules and do not interact with them in any way the slope of the generalized retention curve should not change below the melting point (Im). However, since the valve of the specific retention volume $V_g$ is directly proportional to the weight of the polymer, or the stationary phase, there would be a deviation from linearity if the amount of absorbing phase changed.

Therefore, an extrapolation of the linear portion of the curve to the lower temperature region will, it is believed, represent the theoretical retention curve for the 100 percent amorphous polymer, and any deviation from linearity would be due to a decrease in the amount of amorphous polymer (corresponding to an increase in the amount of impenetrable crystalline polymer).

The amount of amorphous polymer at any temperature below $T_m$ may be determined by a comparison of the experimental value of $V_g$ with the theoretical value $V_g^1$ obtained from the extrapolated curve at the same temperature. The per cent crystallinity is then given by the expression % crystallinity = $100 [1 + (V_g^1/V_g)]$ or $100 [(1 - (tm/ta)]bk$ where
$ta$ = theoretical retention time for a totally amorphous sample;
$tm$ = measured retention time at the same temperature It will be obvious to those skilled in the art that the apparatus will be sensitive to the presence of very small crystallites which can not be detected by standard X-ray diffraction and unlike the density method neither voids nor air bubbles will affect the results.

Figure 8:
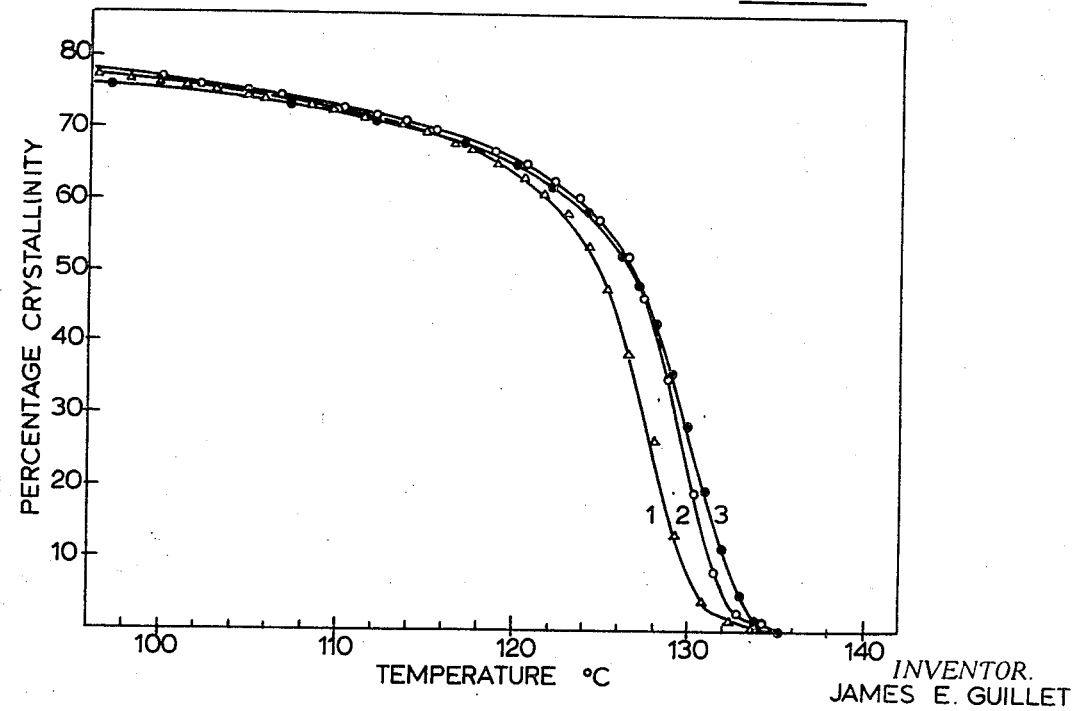
FIG. 8 is a diagram showing the variations in crystallinity of polyethylene over a range of temperatures and when subjected to different heat treatments derived using apparatus in accordance with the present invention.
Figure 9:
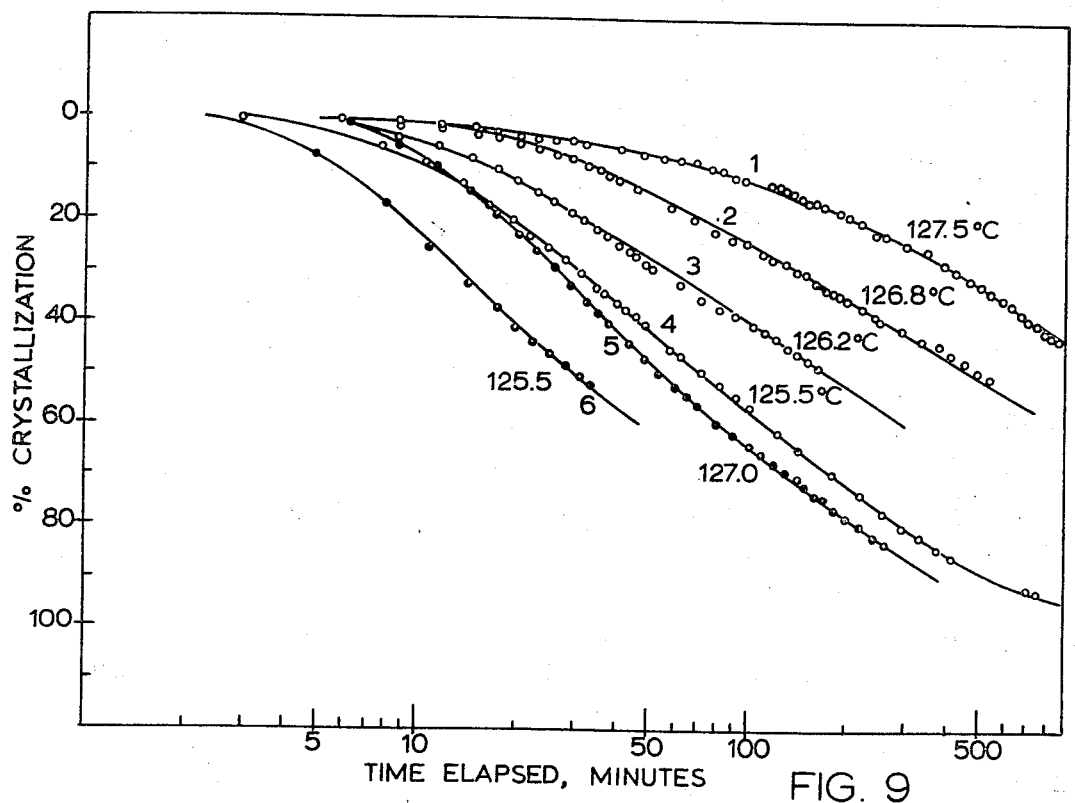
FIG. 9 is a diagram illustrating the rate of crystallization for a high-density linear polyethylene derived using apparatus in accordance with the present invention.
Figure 10:
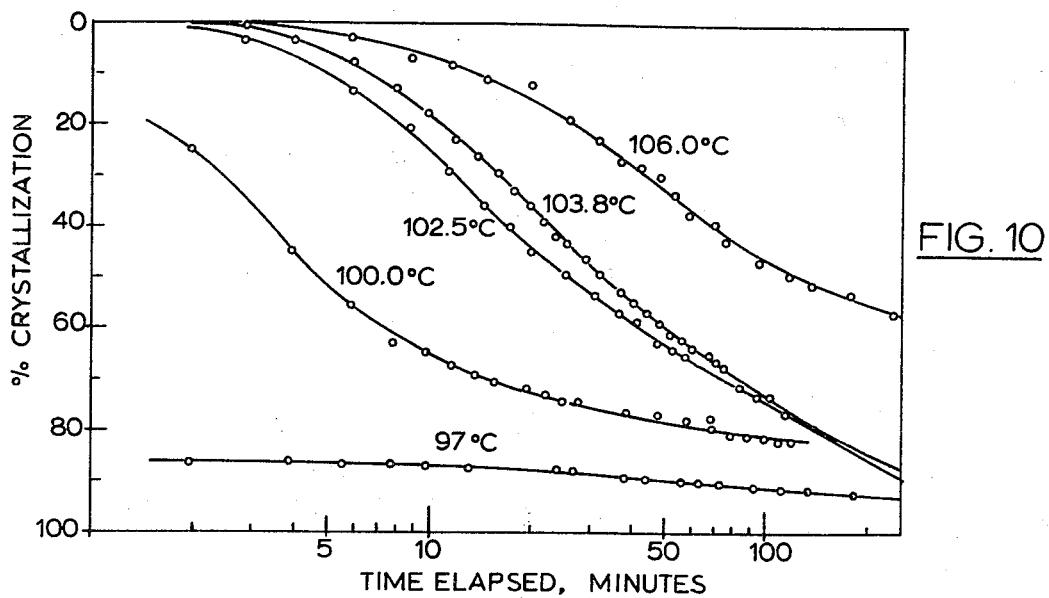
FIG. 10 is a diagram illustrating the rate of crystallization of a branch-chained polyethylene derived using apparatus in accordance with the present invention.

The utility of the apparatus in determining the rate of polymer crystallization in linear and branch-chained polymers is determined by the results shown in FIGS. 8, 9 and 10.

The high-density polyethylene which was examined to give the results shown in FIGS. 8 and 9 was Tenite 3310, Tennessee Eastman, Co. To obtain these results column 15 was a 1 meter ¼ inch O.D. copper tube packed with 0.16 gm of the high density polyethylene coated on 60–80 mesh glass beads. The packing, containing 0.6 percent by weight of the polymer, was sieved 50–80 mesh before use. The glass beads were coated by stirring with a xylene solution of the polyethylene at a temperature about 10° C below the polymer melting point until the solvent had evaporated. The sample was cooled rapidly prior to the measurements. Column 15 was then connected to the sample valve 13 and the previously described procedure followed by increasing the sample temperature at a rate of 0.5°C/min through the linear temperature programmer. The carrier gas was nitrogen and the probe was decane. The carrier gas flow rate was adjusted to give retention times between 10 to 500 seconds. The crystallinity of this sample is indicated by curve 1 in FIG. 8.

The same procedure was repeated except that the polyethylene cooled more slowly before measurement at a rate of 1.0°C/min. The crystallinity of this sample is indicated by curve 2 in FIG. 8.

A comparison was then made, by means of a differential scanning calorimeter of a sample of the same polyethylene cooled at a rate of 1.25°C/min and this was subject to the same measurements except that the temperature was raised at a rate of 1.25°C/min.

It is believed that the differing percentages of crystallinity is due to the heating rate of 0.5° min is too fast to permit equilibrium crystallization to be achieved at any given temperature. The fusion of the rapidly cooled material at lower temperatures is believed to be due to less perfect crystallinity.

It will be recalled that the maximum possible degree of crystallinity at a given temperature is related to the retention times as follows:

(% Crystallinity)$_{max}$ = $100 [1 - (te/ta)]$ where,
$ta$ is the retention time expected for a totally amorphous sample, determined by extrapolation to the temperature under study;
and $te$ is the retention time for the polymer sample when crystalline and amorphous regions have reached equilibrium.

The percentage crystallization of a sample at any fixed flow rate may be determined by:

$$100 \times (\% \text{ Crystallinity}) / (\% \text{ Crystallinity})_{max} = [(ta-tm)/(ta-te)] \times 100$$

Curves 1 to 4 illustrated in FIG. 9 were obtained by heating the linear polyethylene columns to 170°C for at least 30 minutes and cooling quickly to the crystallization temperature indicated adjacent the respective curves. To obtain curves 5 and 6 the linear polyethylene was heated to 170°C for 10 minutes then held at 140°C for about 30 minutes before cooling to the crystallization temperature.

It will be observed that after the latter treatment the onset of crystallization occurs much more quickly at a given temperature.

The results for a branched-chain polyethylene over a range of temperatures is illustrated in FIG. 10.

The polyethylene employed was Tenite 800, Tennessee Eastman Co. The column 15 used was 1.2 meters × ¼ inch O.D. copper tubing. The column was prepared as for the linear polyethylene but 30–60 glass mesh beads were coated with 0.17 gm of the low-density polyethylene. The same solvent was used. The measurements were made following the same procedure as was followed in last described procedure with polyethylene.

From the foregoing description and drawings it will be seen that the apparatus which has been disclosed is capable of effecting measurements on various materials other than polymers. However, it will also be apparent that by its use measurements with respect to physical characteristics and properties of large molecules and their interaction with smaller molecules may be more easily and quickly determined than before.

It will be understood that whilst a specific embodiment has been described and specific examples used to illustrate the results to be obtained other embodiments may be devised which embody equivalents falling within the scope of the present invention and other materials may be observed and employed without departing from the spirit of the invention as defined by the appended claims.

What I claim as my invention is:

1. Apparatus for determining the physical characteristics of particulate materials comprising:

a tube for carrying the material whose characteristics are to be determined, said tube having an inlet and an outlet and being of a material inert with respect to the material whose characteristics are to be determined;

heating means associated with said tube, variable temperature control means for controlling said heating means;

carrier gas control means connected to said inlet for determining the rate of flow and pressure of a stream of carrier gas, injection means for introducing predetermined quantities of a probe in the vapor phase and non-reactant marker gas into said carrier gas stream;

gas detector means disposed in said tube adjacent said outlet for generating a signal in response to detection of each of said marker gas and said probe, respectively;

first timer means and second timing means, said second timer means actuating said injection means at predetermined intervals, said first timer means being responsive to said signal generated by said gas detector means to determine the retention time of said probe molecule.

2. Apparatus is claimed in claim 1 wherein said second timer means includes means for resetting said temperature control means at predetermined spaced apart intervals.

3. Apparatus as claimed in claim 1 further including means for recording said retention time and said temperature.

4. Apparatus as claimed in claim 3 wherein said means for recording is a graphical display means.

5. Apparatus as claimed in claim 3 wherein said means for recording is digital.

6. Apparatus as claimed in claim 3 further including means for recording the pressure.

7. Apparatus as claimed in claim 1 including second timing means responsive to said signal generated by said gas detector in response to detection of said probe for resetting said temperature control means at predetermined spaced apart temperatures and actuating said injection means.

8. Apparatus as claimed in claim 1 wherein said variable temperature control means may be varied at a continuous rate.

* * * * *